United States Patent [19]

Williams

[11] Patent Number: 4,487,167

[45] Date of Patent: Dec. 11, 1984

[54] OSCILLATING PISTON DIESEL ENGINE

[76] Inventor: Robert H. Williams, Rte. 2, Box 44, Bandera, Tex. 78003

[21] Appl. No.: 341,764

[22] Filed: Jan. 22, 1982

[51] Int. Cl.³ ............................................. F02B 53/04
[52] U.S. Cl. ................................................. 123/18 R
[58] Field of Search ..................... 123/18 R, 225, 289, 123/661

[56] References Cited

U.S. PATENT DOCUMENTS

| 2,060,937 | 11/1936 | Hinckley et al. | 123/225 |
| 3,707,073 | 12/1972 | Bernstein | 123/18 R X |
| 3,738,332 | 6/1973 | Eyzat et al. | 123/289 |
| 4,005,687 | 2/1977 | Jonathan | 123/18 R X |
| 4,214,557 | 7/1980 | Beach | 123/18 R |

FOREIGN PATENT DOCUMENTS

| 2735725 | 2/1979 | Fed. Rep. of Germany | 123/18 R |
| 93902 | 7/1980 | Japan | 123/225 |

Primary Examiner—Michael Koczo

[57] ABSTRACT

A rotary internal combustion engine capable of operating under compression ignition, comprises a cylinder bore in a stator sealed between parallel end walls, an engine shaft journaled in the end walls, concentric with the cylinder bore, an air-compressing rotor keyed eccentrically to the engine shaft, the rotor generally annular, traveling clockwise, a wiper vane across its head sucking in air through a one-way inlet port in the perimeter of the cylinder bore, at the same time compressing the air ahead of it which was inhaled during the preceding revolution. The rotor compresses air into a combustion-expansion chamber formed inside the elbow of an L-shaped abutment coextensive with the end walls, the abutment with a clockwise end pivoted in a shallow seat in the face of the cylinder at about 2:00 o'clock, the base of the abutment, a plate generally rectangular, reaching counter-clockwise, thence turning upward to form an arcuate extension to reciprocate in a channel in the stator head, a fixed casting adjacent the base of the channel closing the upper part of the combustion-expansion chamber to serve as a compression head, the base of the abutment riding on the eccentric rotor. A fuel injector is positioned to inject fuel into the combusion chamber when the rotor head is at approximately top center, and a glow plug is positioned to facilitate ignition. Expanding combustion gases drive the abutment downward in a power stroke, forcing the eccentric rotor to rotate. Two ports vent the engine, one a horizontal port through the stator opposite the combustion chamber, the other in the outer end of the channel. When the abutment drops to the end of the downward stroke, at the end of the expansion stroke, its upper end uncovers the horizontal port and at the same time withdraws out of the channel, the spent gases flowing out through both ports. The eccentric rotor lifts the abutment on the upward stroke, re-covering the ports on the upward compression stroke.

2 Claims, 5 Drawing Figures

OSCILLATING PISTON DIESEL ENGINE

SUMMARY OF THE INVENTION

This rotary internal combustion engine, like my U.S. Pat. No. 4,286,555, holds the fuel charge in the combustion chamber throughout the power stroke, the combustion chamber being so devised that it allows the gases to expand without being released till they are spent. Many rotary engines release the gases promptly after ignition to push an eccentric piston head round inside the cylinder bore, but no way has been found to satisfactorily seal the traveling piston head against the cylinder, the frequently-adopted sliding vane seal being unable to expand dependably against the side pressures of combustion gases, and therefore the piston head loses contact with the cylinder. Furthermore, that type of rotary engine loses fuel efficiency because of volumetric clearance in the radially expanding combustion-expansion chamber. The expanding fuel charge in the invention engine can be tightly sealed in, and the shape of the expansion chamber in relation to the combustion chamber is highly efficient.

This engine also is simple, requiring only two major working parts and only ports for air inlet and exhaust venting, by contrast with conventional four-stage cycle piston engines, which require cam-opened, spring returned poppet valves. And both the inlet and the venting ports are very large, preventing choking.

Like my earlier patent, above cited, the invention engine sucks in and compresses two-and-a-half to three times as much air as a conventional piston engine of equal displacement can get without a supercharger. The extra air is of prime importance in modern internal combustion engines. One manufacturer states, for example, that the company has doubled the power of a certain conventional eight-cylinder engine by adding a supercharger and eight air intake valves, making two intake valves to the cylinder.

The invention engine, firing every revolution, uses the abundance of air to sweep the expansion chamber clean quickly after the end of the power stroke so the combustion chamber can be re-closed promptly to catch the next full charge of compressed air. Four cylinders of this engine accomplish the work of eight cylinders of a four-phase cycle engine with much greater power per displacement volume because of the extra air and a much lighter pumping load.

After the rotor pumps the air out of the cylinder into the combustion chamber, raising the pressure in the chamber to about 200 psi or a little higher, when the engine is set to operate as a diesel, the eccentric rotor head produces a second stage of compression as it travels on to top center. Since the abutment base plate constitutes roughly a chord across the top of the cylinder, the rotor head continues to force it upward, squeezing the air in the combustion chamber to 300 pounds or higher (as pre-determined by the manufacturer in fixing the cubic volume of the combustion chamber at maximum compression). This compression level is suitable for efficient diesel operation, with compression ignition (preferably with the aid of a glow plug).

Whereas conventional piston engines operating as diesels are sluggish in pedal response and are noisy, the invention engine must accelerate quickly, partly because of the rotary motion and partly because of its very light pumping load; and it operates with the complete absence of the valve, cam and gear noises.

The subject engine is optionally operated at a lower level of compression, preferably about midway between that of most gasoline-burning automobile engines now being marketed and that of a diesel engine: with a thirteen-to-one or fourteen-to-one compression ratio. The compression ratio is determined at the factory by the cubic volume of the combustion chamber when squeezed to its minimum capacity. The compression head casting is installed somewhat higher than for diesel operation. The larger volume of the combustion chamber allows the compressor to pump the same quantity of air into it without raising the pressure as high, the second stage of compression bringing the pressure up to about 200 psi at the time of ignition. In this operation all the air is allowed to flow in, as when running as a diesel, and fuel is injected, the fuel having a flash point somewhat higher than that of white gasoline but lower than that of No. 2 diesel.

The comparatively small space and light weight of the two-cycle invention engine, together with the abundance of air it inhales and its quick pedal response, adapt it particularly well to use with automobiles and propellor-driven airplanes.

BRIEF EXPLANATION OF THE DRAWINGS

FIG. 1A is a fragmented end view, slightly enlarged, of one of the air inlet valves in the abutment, which admit air from the compressing rotor to the combustion chamber.

DETAILED DESCRIPTION OF PREFERRED EMBODIMENTS

Figure 1:
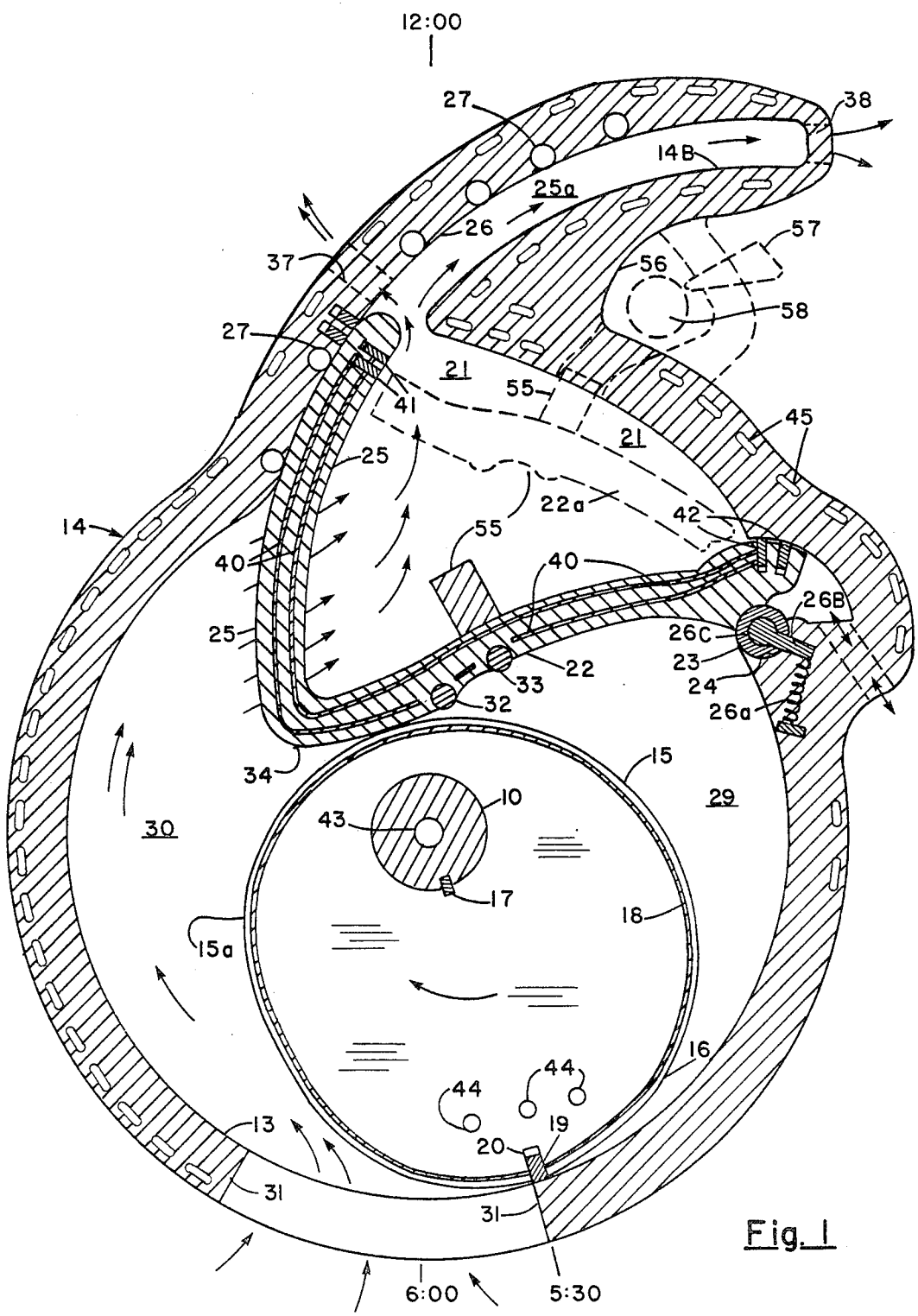
FIG. 1 is an end view with the end wall removed showing the L-shaped abutment with rotor head 16 at about 5:30 o'clock, about midway between the end of the power stroke and the re-covering of the exhaust ports; showing also engine head 21C, abutment enlargement 28A, abutment end seals 39 and roller bearings 36 and 36A.
Figure 5:
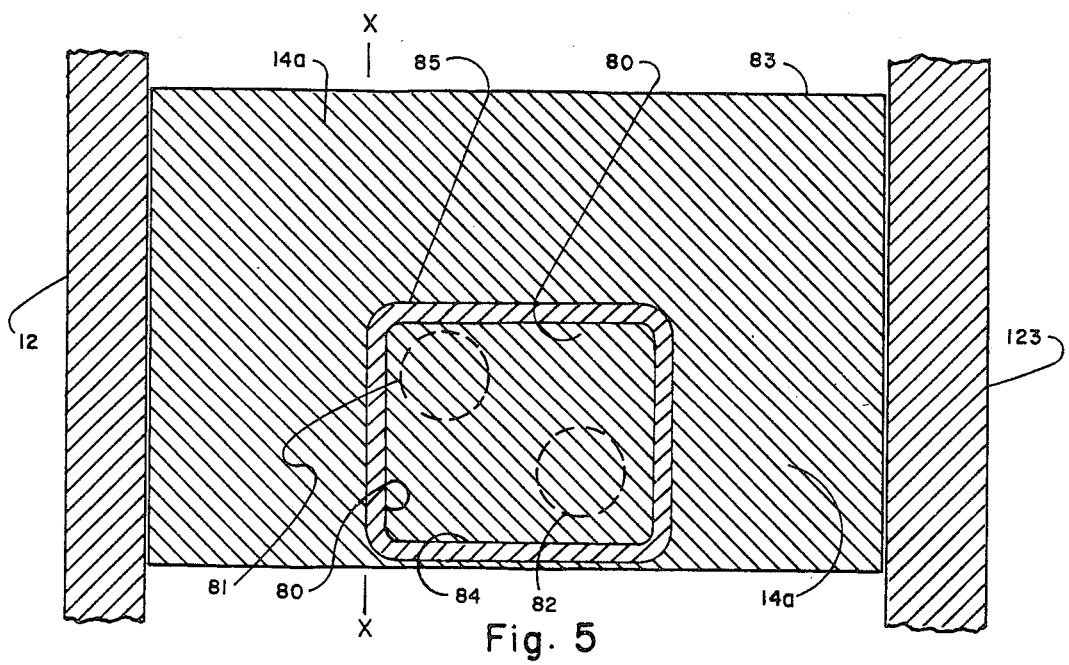
FIG. 5 is a mirror image of prechamber 33, taken underneath engine head casting 21C, showing an alternate view of the positioning of the prechamber under the engine head, and showing the relative positions of fuel injector 34 and glow plug 35.
Figure 4:
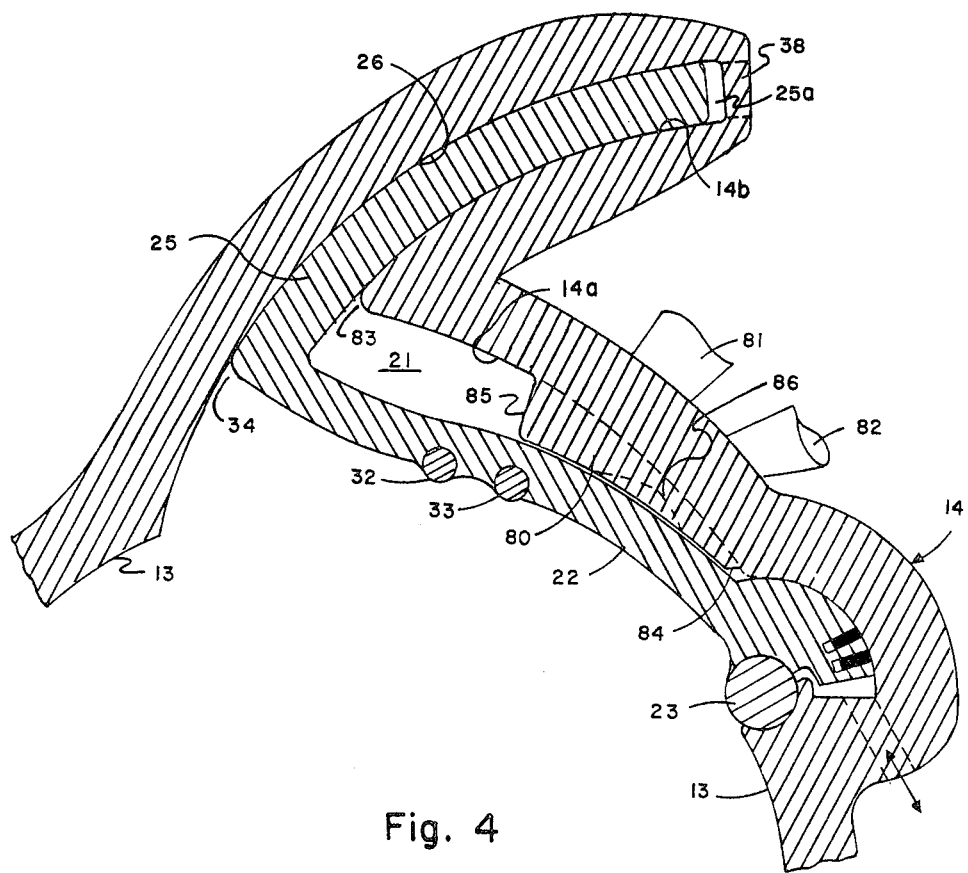
FIG. 4 is a sectional end view of the abutment and the engine head, on a line with a side of prechamber casting 33, with the abutment at maximum compression, showing the position of the prechamber casting on the under side of engine head 21C, the positioning of fuel injector 34 and spark plug 35, and indicating in broken lines the fuel-spreader mound, 35A.
Figure 3:
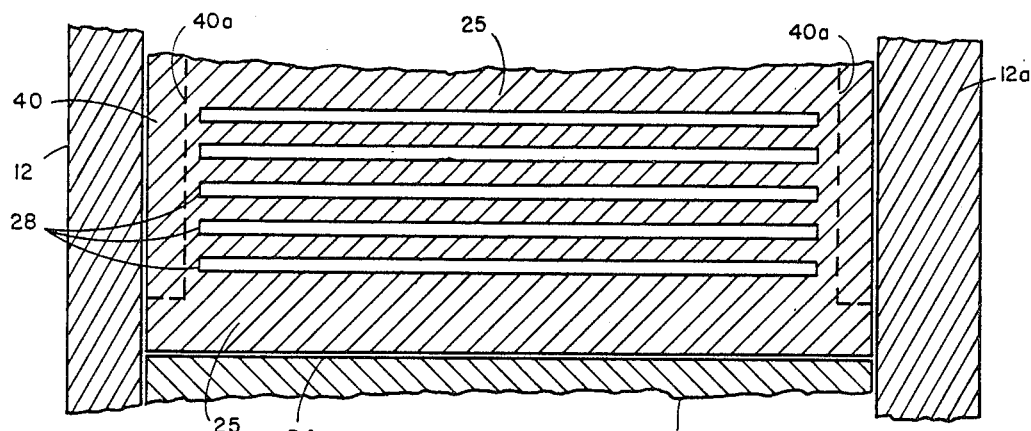
FIG. 3 is a fragment of abutment extension 25, viewed from inside the expansion chamber, with the abutment elbow, 22A, riding on rotor 15 showing slots 27 which house one-way inlet valve rods to admit air to the combustion chamber; showing also abutment and seals 39 in slots 40; showing also restraining bars 28 which prevent the valve rods from flying out of the slots.
Figure 2:
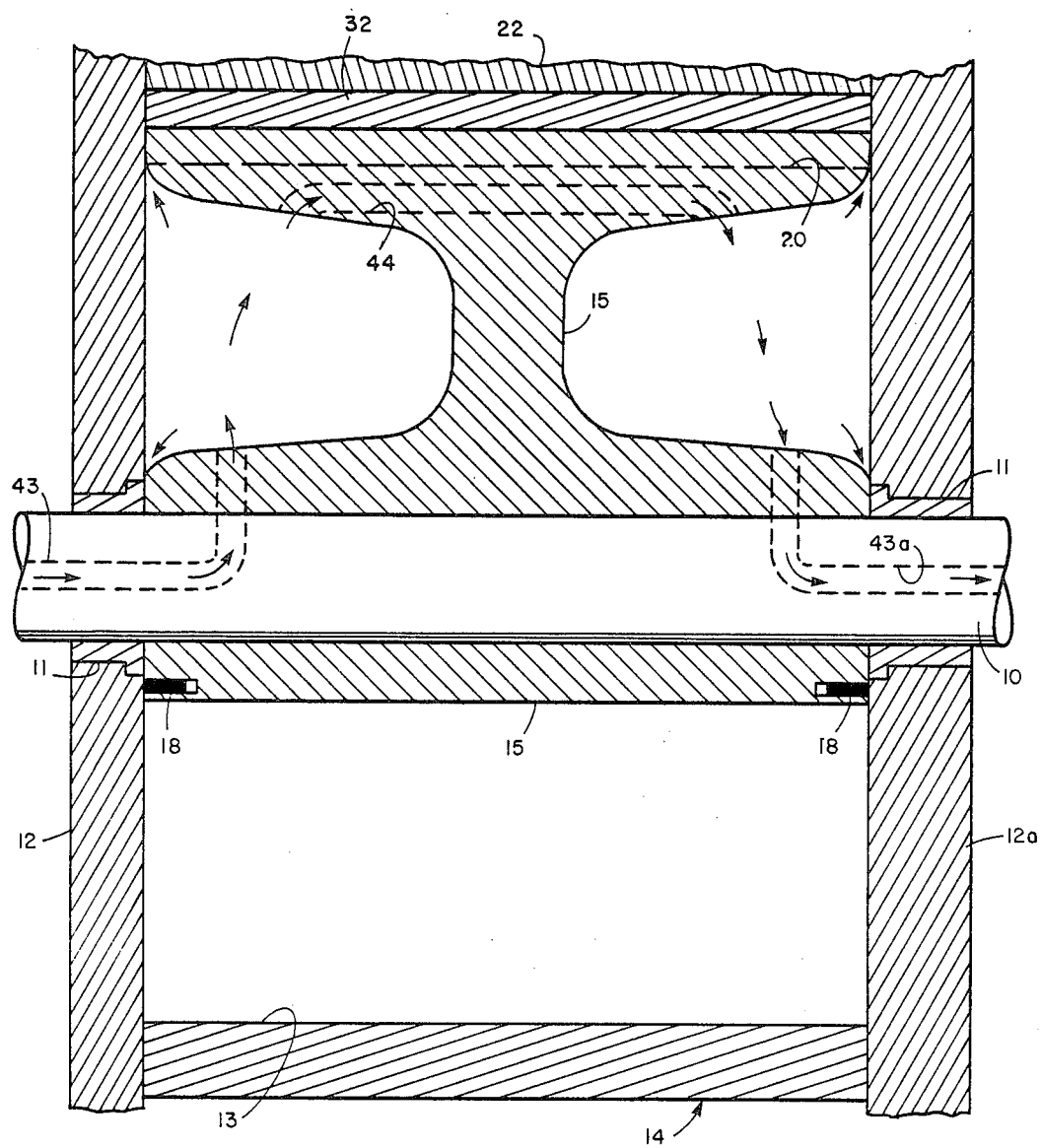
FIG. 2 is a vertical section of the lower part of the engine on a line from 6:00 o'clock upward through the shaft, showing roller bearing 36 riding on rotor 15, with the rotor head upward; also showing channels 45, 46 and 47, which conduct cooling and lubricating oil through the rotor.

An engine shaft, 10, is supported in bearings 11 in parallel end walls 12 and 12A, which seal between them cylinder bore 13 in stator 14, the bore concentric with the engine shaft. An eccentric rotor, 15, generally annular but with optional minor modifications of its perimeter curvature for functional uses, such as a slightly flattened span, 15A, ahead of the rotor head, 16, is keyed to the shaft by key 17, the eccentric rotor head barely clearing the cylinder bore and its ends barely clearing the end walls. End seal 18 is installed in groove 18A on each end of the rotor to maintain sliding sealing engagement with the end walls. A wiper blade, 19, is fitted in slot 20 across the rotor head to sweep the cylinder bore to compress air into combustion-expansion chamber 21, the air ingested via port 21A and one-way inlet valves 21B. The combustion-expansion chamber is formed inside the elbow of a pivoted L-shaped abutment which rides at all times on the rotor and which is caused by the rotor to squeeze a charge of air upward against engine head 21C, as the eccentric rotor forces the abutment upward on a compression stroke. The abutment has a rectangular base plate, 22, which reaches from abutment elbow 22A clockwise to its anchorage on a pivot, 23, which pivot is parallel to the engine shaft and which works in shallow seat 24 in the stator near 2:00 o'clock. The pivoted anchorage allows the abutment to swing vertically inside the cylinder space. The base plate reaches counter-clockwise from the pivot well past a vertical line through the engine shaft and 12:00 o'clock, turning upward at elbow 22A to form arcuate abutment extension, or arm, 25, which arcuate shape has pivot 23 as its center.

The arcuate arm houses one-way inlet valves comprising annular rods 26 in slots 27, with restraining bars 28, through which slots air is compressed from the cylinder into the combustion chamber during the compression stroke, as the eccentric rotor forces the abutment upward.

Base plate 22 is preferably enlarged on its upper face at its pivoted end, the enlargement, 28A, comprising a section of a cylinder concentric with pivot 23, from end wall to end wall, the function of the enlargement being to provide room for at least one transverse seal, 28B. As the abutment rises on its upward stroke the cylindrical enlargement is received in a close-fitting cavity, 28C, in the stator.

Since the rotor completes its first-stage compression stroke by the time its head reaches a position approximately thirty degrees from top center, having pumped the air out of the cylinder into the combustion chamber by that time, the eccentric head produces a second-stage of compression as it travels on to top center, further compressing the air trapped in the combustion chamber.

To permit abutment base plate 22 to travel upward almost to meet the engine compression head, to squeeze the trapped air, a channel in the stator is formed between arcuate faces 29 and 30, each channel with pivot 23 as its center, the channel, 31, to receive the abutment extension arm on its upward stroke.

Roller bearings 32 are optionally set in the stator in the outer face of the channel to minimize friction against abutment arm 25 and to help cool that arm.

A prechamber, 33, for fuel injection is formed without adding volumetric clearance to the combustion-expansion chamber, the prechamber comprising a rectangular wall cast on the underside of the engine head, the wall low on its clockwise side, 33A, and higher on its opposite side, 33B, the wall meeting the upper face of base plate 22 of the abutment at the upward extremity of abutment travel, and enclosing a small area to trap a small volume of compressed air long enough to permit injection and firing of a fuel charge. Fuel injector 34 and glow plug 35 project into the prechamber, the injector timed to fire a charge of fuel in relation to the position of the rotor head, and the glow plug to aid in igniting the charge. The smaller volume of air makes for a richer fuel-air mixture than if the fuel is injected into a greater volume of air; therefore, the prechamber enables the engine to ignite and burn a leaner charge of fuel. The dropping of base plate 22, as the eccentric rotor travels on after ignition, allows the flame to spread throughout chamber 21. The receding face of the rotor allows the prechamber to open gradually, letting the flame spread gradually through the main chamber, preventing hammering and preventing a peak of heat, which would intensify the generation of nitrous oxides. Deflector mound 35A is a small pyramid of metal cast on the upper face of base plate 22 where the injected fuel must strike it, its function being to spread the fuel in all directions.

The positioning of engine head 21C at the factory according to the desired cubic volume of the combustion chamber, determines whether the engine is to be operated as a diesel, at around 300 psi, or at lower compression levels, with a spark plug instead of a glow plug to facilitate ignition.

Roller bearings 36 and 36A on the under side of base plate 22 are positioned to bear downward on the rotor during the expansion stroke to minimize friction.

Exhaust means comprise slot 37 in the end of channel 31 and horizontal slot 38 through the wall of the stator, the latter port positioned on a level with the ceiling of the combustion-expansion chamber where the tip of abutment arm 25 must uncover it as that tip drops out of channel 31, opening both ports simultaneously for quick scavenging of the spent gases. The one-way valves in the arcuate abutment extension, 25, let air begin to flow into chamber 21 immediately after the exhaust ports are uncovered, when the rotor head is in the vicinity of 4:00 o'clock, since air ahead of the rotor head is compressed to several pounds at that stage of the compression stroke.

The under side of plate 22 and the circumferential curvature of the rotor may be variously shaped for compatibility in their cooperative functions. FIG. 1 shows a preferred combination of shapes. The roller bearings, 36 and 36A, are positioned somewhat more than half way to elbow 22A; and the rest of plate 22, extending from bearing 36 to elbow 22A, is slightly arcuate downward to enable the plate to smoothly engage the rotor, in sealing engagement with it, from the time the rotor head is in the vicinity of 6:00 o'clock throughout the upward part of the compression stroke. As previously recited, the rotor is somewhat flattened for a span of sixty to ninety degrees, becoming annular again a few degrees from the rotor head, the flattening designed to prevent the rotor from lifting the abutment into the stator space prematurely, closing off the one-way valves in arm 25 before the rotor head can pump all the air out of the cylinder into the combustion-expansion chamber.

End seals 39 in grooves 40 in each end of the abutment butt against at least one transverse seal, 41, and at their opposite ends, against at least one of previously cited end seals 28B, the seals completely surrounding the combustion-expansion chamber.

The elbow abutment is spring-biased downward against rotor 15 by a spring mechanism outside at least one end wall, the mechanism comprising an extension, 42, of pivot 23 outward through the end wall, the extension reduced in diameter and squared to receive a squared socket in lever 43, which is under pressure at all times by spring 44. The spring aids in insuring that base 22 of the abutment engage rotor 15 when the starter begins turning the engine, before ignition. With one-way air inlet port 21A centered near 6:30 o'clock, a partial vacuum generated by the clockwise-traveling rotor during the early part of the compression stroke aids in drawing the abutment downward to insure its contact with the rotor while the engine is being started.

Bore 45 in engine shaft 10 conducts pressurized cooling oil inside the cylinder, and channels 46 conduct the oil through the web of the rotor for ejection via bore 47 in the engine shaft. The pressurized oil also coats the end walls lubricating the rotor end seals. Various other means of internal lubrication are, of course, optional, such as an oil mist sprayed into the ingested air.

Channels 48 in the stator are for cooling water.

OPERATION

The invention engine has the four phases of intake, compression, expansion and exhaust with each revolution of the engine shaft without need of cam-operated valves. FIG. 1 shows rotor head 16 almost at 5:30 o'clock, about the middle of the venting action, traveling clockwise. In its downward travel from top center it began a suction stroke and a compression stroke, creating a partial vacuum behind it to be filled by air as soon as the rotor head reaches one-way air intake port 21A, and at the same time compressing ahead of it the air drawn in during the preceding revolution. The rotor, on its upward stroke, forces the abutment upward, at the same time pumping the air ahead of it into a combustion-expansion chamber which is formed inside the elbow of the abutment, between it and engine head 21C and between the end walls, the air forced in past one-way inlet rollers 26 in slots 27 in the counter-clockwise face of abutment arm 25. Vertical bars 28 prevent the rollers from flying out of their slots. When head 16 of the rotor is a few degrees before top center a charge of fuel is injected via injector 34 into compressed air in the combustion-expansion chamber and ignited by compression ignition aided by glow plug 35, if the engine is operating as a diesel, or by a spark plug if the engine is operating at a lower level of compression. The combustion gases, expanding, drive the abutment downward, forcing eccentric rotor 15 to rotate. When the rotor head reaches a position at or a little past 4:00 o'clock, the end of the expansion stroke, the upper tip of extension 25 of the abutment drops out of channel 31, opening exhaust port 37 and at the same time uncovering exhaust port 38. As soon as the pressure inside the expansion chamber drops below that in the compression cylinder the air pressure ahead of the rotor forces open the one-way valves in slots 27 in the counter-clockwise face of the arcuate extension of the abutment, air, under a few pounds pressure at this stage of compression in chamber 13, sweeping chamber 21 clean. As rotor 15 begins lifting the abutment on the upward stroke, abutment extension 25 moves upward, closing channel 31, thus closing the exhaust ports to let the combustion-expansion chamber receive the next charge of compressed air, and the cycle repeats.

I claim:

1. A rotary internal combustion engine having the four phases of intake, compression, expansion and exhaust with each revolution of the engine shaft, the engine comprising:

a stator with a cylinder bore sealed between parallel end walls;

a power shaft concentric with the cylinder bore supported in bearings in the end walls;

an eccentric rotor fixed to the power shaft, virtually coextensive with the end walls, its head barely clearing the cylinder, each of the rotor ends fitted with yieldable seals to sweep the end walls;

a transverse wiper blade in a slot across the rotor head, spring biased outward to yieldably sweep the face of the cylinder to form a suction stroke behind it and a compression stroke ahead of it as the rotor travels, to suck air into the cylinder through a port in the lower part of the stator and at the same time to force air ahead of it into a combustion chamber;

an air inlet port centered between 5:00 and 7:00 o'clock, comprising an opening in the stator fitted with one-way inlet valves, to allow air to be sucked into the cylinder but prevent it from being pumped out via the inlet port;

an abutment comprising a rectangular metal base plate turned upward at one end to form an "L", the base plate rounded at its other end to form a pivot and the pivot cradled in a shallow seat in the cylinder near 2:00 o'clock, the shallow seat allowing the abutment to oscillate vertically inside the cylinder space as its base plate rides on the eccentric rotor;

the base plate reaching counter-clockwise from its pivoted end somewhat further than a vertical line through the center of the engine shaft;

the upward extension of the abutment in the shape of an arc with the pivot as its center;

the abutment fitted with one-way valves to allow compressed air to pass through from the cylinder during a compression stroke to be trapped in a combustion chamber inside the elbow of the abutment, between the abutment base plate and the stator;

the abutment spring biased downward toward the rotor by a spring outside at least one end wall, the spring bearing against an arm which is fixed to a hub on the end of the abutment pivot extending through the end wall, the pivot to transmit the downward thrust of the spring to the abutment with which it is integral;

the abutment fitted with at least one end seal in a slot, on each end, to sweep the end walls to prevent combustion gases from leaking out of the combustion chamber between the end walls and the ends of the abutment;

a combustion-expansion chamber of variable cubic volume, roughly triangular in shape as viewed from an end, contained inside the abutment elbow, the chamber formed by the abutment base plate as one side, the arcuate abutment extension as the second side and the compression head area of the stator as the third side, the chamber closed on its ends by the end walls between which the abutment is caused to slidably oscillate, the compression head so positioned in the engine casting that when the abutment is at its zenith a combustion chamber of predetermined minimum cubic volume is formed;

an arcuate channel cast in the stator on a radius from the pivot, the channel so positioned and of such dimensions as to receive the abutment extension in a close-fitting cavity on the upward swing of the abutment, to allow the abutment base plate to squeeze a charge of air upward against the compression head;

a fuel injector projecting into the combustion chamber to spray a charge of fuel into the compressed air in the chamber as the rotor head approaches top center, and a glow plug projecting into the same chamber in close proximity to the fuel injector to aid in igniting the fuel charge, the gases of combustion to bear downward on the base plate to cause the eccentric rotor to rotate;

roller bearings on the under side of the abutment base plate positioned to bear on the rotor through the expansion stroke to minimize friction in transferring power from the abutment to the rotor;

primary exhaust means comprising a horizontal slot through the stator near the base of the arcuate channel, on a level with the under side of the compression head, the slot covered by the arcuate extension of the abutment during the compression and expansion strokes but uncovered by that abutment extension as it drops out of its channel at the end of the expansion stroke, the slot allowing compressed air forced into the expansion chamber ahead of the rotor to sweep spent gases out of the engine;

auxiliary exhaust means comprising a slot in the outer end of the arcuate channel which slot is shut off during the compression and expansion strokes by the abutment extension but is uncovered at the end of the expansion stroke when the abutment extension drops out of its channel, allowing the spent gases to flow from the expansion chamber up through the channel and out via the slot;

the forward face of the rotor somewhat flattened for a span of sixty to ninety degrees, the flattened span beginning a few degrees ahead of the wiper blade, the flattening designed to let the rotor pump virtually all the air out of the cylinder into the combustion chamber before the curvature of the rotor lifts the abutment too far into the stator space to allow the abutment inlet valves to function;

means for cooling and at the same time lubricating the rotor, its bearings and the rotor end seals, the means comprising an oil conduit through the engine shaft on a first end of the engine, the conduit opening into the space between the rotor web and the first end wall, bores through the rotor web to the opposite side, an opening on that side into the engine shaft and a conduit through the shaft out through the second end of the engine.

2. The engine of claim 1 including an ignition prechamber for fuel injection comprising a wall cast on the under side of the area of the stator which constitutes the compression head, the wall to mate with a shallow groove in the upper face of the abutment base plate when the abutment arrives at its uppermost position, to nearly seal off a small somewhat rectangular subchamber from the main combustion chamber to trap a small volume of compressed air long enough for a charge of fuel to be injected into the subchamber and ignited;

means for injecting fuel into the trapped air, the means comprising a fuel injector installed to project into the subchamber;

means for insuring the firing of the fuel charge, the means comprising a glow plug projecting into the subchamber in close proximity to the fuel injector;

a small mound generally pyramidal in shape, cast on the upper face of the abutment base plate in such a position that the injected fuel must strike the mound and spread in all directions.

* * * * *